United States Patent
Jeong et al.

(10) Patent No.: US 8,490,155 B2
(45) Date of Patent: Jul. 16, 2013

(54) METHOD AND APPARATUS FOR DETECTING DOWNLOADABLE CONDITIONAL ACCESS SYSTEM HOST WITH DUPLICATED SECURE MICRO

(75) Inventors: Young Ho Jeong, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 579 days.

(21) Appl. No.: 12/256,599

(22) Filed: Oct. 23, 2008

(65) Prior Publication Data

US 2009/0158395 A1     Jun. 18, 2009

(30) Foreign Application Priority Data

Dec. 17, 2007 (KR) .................. 10-2007-0132005
Jan. 28, 2008 (KR) .................. 10-2008-0008494

(51) Int. Cl.
*G06F 7/04* (2006.01)
*G06F 17/30* (2006.01)
*G06F 15/16* (2006.01)

(52) U.S. Cl.
USPC ............ 726/2; 726/26; 726/27; 709/229

(58) Field of Classification Search
USPC ............................................. 726/2
See application file for complete search history.

(56) References Cited

U.S. PATENT DOCUMENTS

| | | | | |
|---|---|---|---|---|
| 6,069,877 A | * | 5/2000 | Yang | ............... 370/252 |
| 6,246,767 B1 | | 6/2001 | Akins, III et al. | |
| 7,073,197 B2 | * | 7/2006 | Rabin et al. | ............... 726/18 |
| 7,231,360 B2 | * | 6/2007 | Sy | ................... 705/29 |
| 7,257,515 B2 | * | 8/2007 | Haeuptle | ............... 702/185 |
| 7,752,675 B2 | * | 7/2010 | Lee | .................. 726/26 |
| 7,836,507 B2 | * | 11/2010 | Ono et al. | ............. 726/26 |
| 7,904,572 B2 | * | 3/2011 | Tadokoro et al. | ........... 709/229 |
| 2003/0163693 A1 | * | 8/2003 | Medvinsky | .............. 713/169 |
| 2003/0225863 A1 | * | 12/2003 | Kajino et al. | ............. 709/219 |
| 2008/0086771 A1 | * | 4/2008 | Li et al. | ................. 726/20 |
| 2008/0177998 A1 | * | 7/2008 | Apsangi et al. | ........... 713/155 |

FOREIGN PATENT DOCUMENTS

| | | |
|---|---|---|
| KR | 1020030091866 A | 12/2003 |
| KR | 1020090054679 A | 6/2009 |

OTHER PUBLICATIONS

J.Y. Moon, et al; "Trends on Technologies for Interoperability of Various Conditional Access Systems", Electronics and Telecommunications Trend Analysis, vol. 21, No. 5, Oct. 2006, 10 pages.
Yonghoon Lee, et al; "Effective Multiplexing Method for Conditional Access System in Terrestrial DMB", ETRI Journal, vol. 30, No. 6, Dec. 2008; pp. 859-861.

* cited by examiner

*Primary Examiner* — Saleh Najjar
*Assistant Examiner* — Feliciano Mejia
(74) *Attorney, Agent, or Firm* — Ladas & Parry LLP (57) ABSTRACT

A method where a Downloadable Conditional Access System Provisioning Server (DPS) detects a duplicated secure micro is provided. A method of detecting a duplicated secure micro, the method including: generating authentication time difference information associated with a value of a difference between a time when a host is finally authenticated in a first address and a time when the host is authenticated in a second address; comparing the authentication time difference information with a first reference value and a second reference value, the second reference value being less than the first reference value; and determining whether the secure micro is duplicated based on a result of the comparing.

10 Claims, 6 Drawing Sheets

METHOD AND APPARATUS FOR DETECTING DOWNLOADABLE CONDITIONAL ACCESS SYSTEM HOST WITH DUPLICATED SECURE MICRO

CROSS-REFERENCE TO RELATED APPLICATIONS

This application claims the benefit under 35 U.S.C. §119(a) of Korean Patent Application No. 10-2007-0132005, filed on Dec. 17, 2007, and Korean Patent Application No. 10-2008-0008494, filed on Jan. 28, 2008 in the Korean Intellectual Property Office, the entire disclosures of which are hereby incorporated by reference.

BACKGROUND OF THE INVENTION

1. Field of the Invention

The present invention relates to a technology that detects whether a secure micro is duplicated in a Downloadable Conditional Access System (DCAS) network, and performs an appropriate operation based on a result of the detecting.

This work was supported by the IT R&D program of MIC/IITA. [2007-S-007-01, The development of downloadable conditional access system]

2. Description of Related Art

When users desire to watch a specific program, a Conditional Access System (CAS) in cable networks determines whether to provide a service based on a user authentication and enables only approved user to receive the program.

Since initial CA systems respectively uses different standards depending on each manufacturing company, initial CA systems are incompatible with devices other than a device of a specific manufacturer. Accordingly, since a broadcasting service provider must directly provide subscribers (members) with receiving terminals, burdens on the broadcasting service provider are heavy, and updating the CA system is difficult.

In order to solve the above-described problem, OpenCable of North America announced a standard of separating a CA module from a member terminal. This is for preventing a device manufacturer from monopolizing the market, and for promoting competition, thereby inducing product prices to fall. The CA module separated from the terminal is standardized into a cable card of a Personal Computer Memory Card International Association (PCMCIA) card type, and the broadcasting service provider may provide a paid broadcasting service by providing the subscribers with only cable cards without lending the terminals to the members, similar to the previous scheme. However, since a price of the cable card rises, management cost increases, and a retail market of the terminals is diminished, a result desired by OpenCable is not accomplished.

In this situation, a Downloadable Conditional Access System (DCAS)-related technology of enabling the paid broadcasting service by downloading CA software to a member terminal without separately requiring a hardware CA module is introduced.

In a DCAS technology, an authenticated DCAS host downloads a secure micro client image, and performs a key management function to access a fee-based program using the secure micro client. However, when a secure micro of DCAS host may be duplicated in an inappropriate way, and the secure micro client image may be downloaded using the duplicated secure micro, a DCAS technology may not succeed.

Accordingly, it is required to check whether a DCAS host operates a duplicated secure micro. When it is determined that a DCAS host manages a duplicated secure micro, it is required to deny a program access authority of a corresponding DCAS host. Thus, a technology capable of detecting a duplicated secure micro, and performing an appropriate operation based on a result of the detecting is required.

SUMMARY OF THE INVENTION

An aspect of the present invention provides a method and apparatus for detecting a downloadable conditional access system (DCAS) host with a duplicated secure micro (SM) which may efficiently determine whether an SM is duplicated using authentication time difference information associated with a value of a difference between a time when a host is finally authenticated in a first address and a time when the host is authenticated in a second address.

Another aspect of the present invention also provides a method and apparatus for detecting a DCAS host with a duplicated SM which, when it is suspected that an SM is duplicated based on authentication time difference information, may efficiently determine whether the SM is duplicated based on a number of identifications (IDs) received from the SM.

Another aspect of the present invention also provides a method and apparatus for detecting a DCAS host with a duplicated SM which, when it is determined that an SM is duplicated, may deny a program access authority of the SM.

According to an aspect of the present invention, there is provided a method of detecting a duplicated secure micro, the method including: generating authentication time difference information associated with a value of a difference between a time when a host is finally authenticated in a first address and a time when the host is authenticated in a second address; comparing the authentication time difference information with a first reference value and a second reference value, the second reference value being less than the first reference value; and determining whether the secure micro is duplicated based on a result of the comparing.

According to an aspect of the present invention, there is provided a Downloadable Conditional Access System Provisioning Server (DPS) detecting a duplicated secure micro, including: a database to store a time when a host is finally authenticated in a first address, the time being received from an AP server; an authentication time difference information generation unit to receive a time when the host is authenticated in a second address from the AP server, and generate authentication time difference information associated with a value of a difference between the time when the host is finally authenticated in the first address and the time when the host is authenticated in the second address; a time comparison unit to compare the authentication time difference information with a first reference value and a second reference value, the second reference value being less than the first reference value; and a duplication determination unit to determine whether the secure micro is duplicated based on a result of the comparing.

According to an aspect of the present invention, there is provided an operation method of an AP server, including: transmitting, to a DPS, a time when a host is finally authenticated in a first address and a time when the host is authenticated in a second address; collecting, when a value of a difference is between a predetermined first reference value and second reference value, IDs of a secure micro of the host in response to a request for collecting the IDs of the secure micro from the DPS, the value of the difference being a difference between the time when the host is finally authenticated in the first address and the time when the host is authenticated in the second address; and transmitting the collected IDs to the DPS.

According to an aspect of the present invention, there is provided an operation method of a subscriber management system, the operation method including: receiving a request for denying a program access authority of a secure micro from a DPS, when the DPS determines that the secure micro is duplicated; detecting a host where the secure micro is installed using the request for denying the program access authority of the secure micro; and denying the program access authority of the host.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
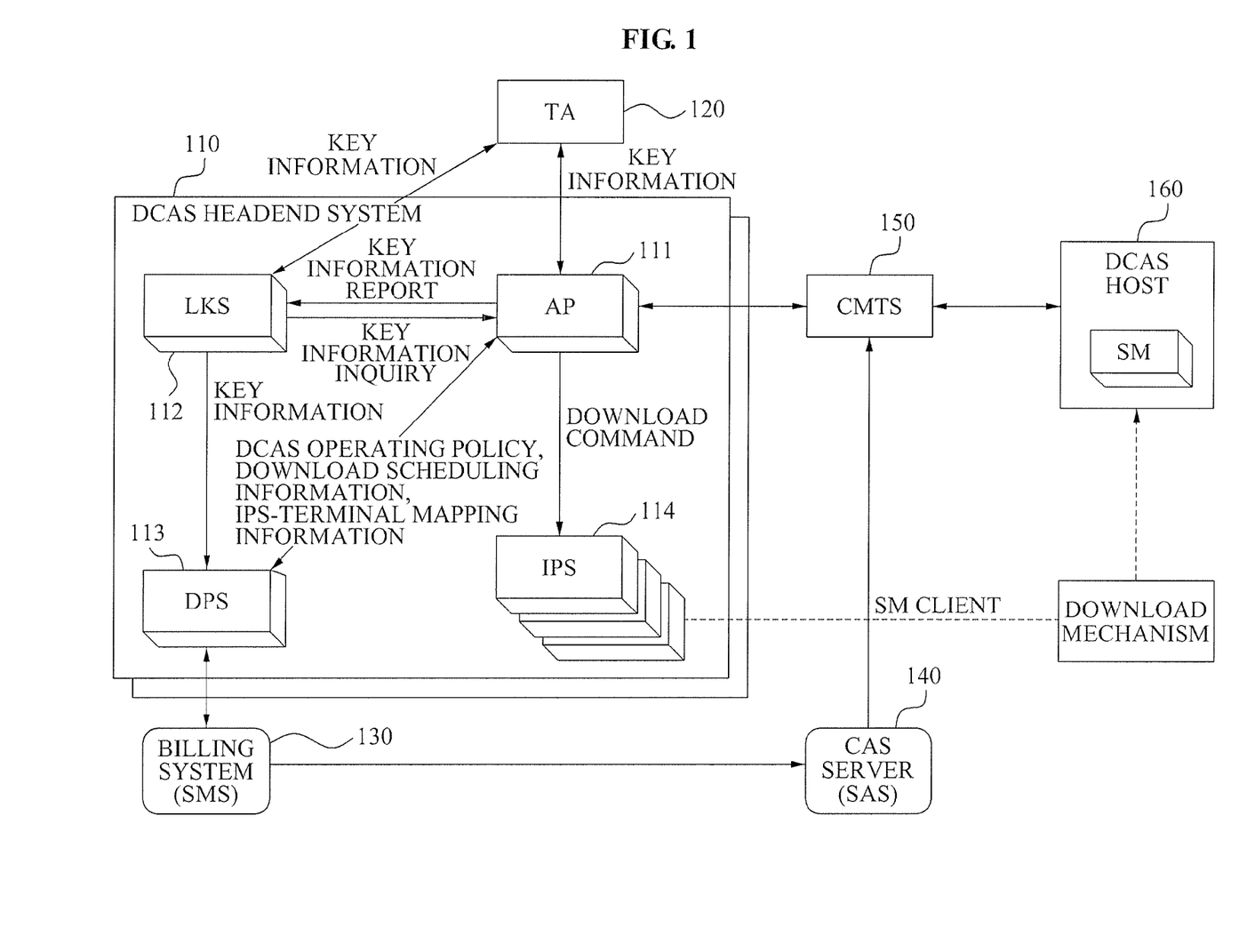
FIG. 1 is a diagram illustrating a Downloadable Conditional Access System (DCAS) including a DCAS headend system and DCAS host according to an embodiment of the present invention.

FIG. 1 is a diagram illustrating a Downloadable Conditional Access System (DCAS) including a DCAS headend system 110 and DCAS host according to an embodiment of the present invention.

Referring to FIG. 1, the headend system 110 includes an Authentication Proxy (AP) server 111, Local Key Server (LKS) 112, Downloadable Conditional Access System Provisioning Server (DPS) 113, and Integrated Personalization System (IPS) server 114.

The headend system 110 is installed separately from an existing Conditional Access System (CAS) server 140. Also, the headend system 110 is operated independently from the CAS server 140, and thus may be compatible with an existing cable broadcasting system.

The LKS 112 stores and manages information about keys of servers such as a key of a secure micro (SM), history of identification (ID) information of the SM, key of the AP server 111, history of ID information of the AP server 111, and history of key information of the IPS server 114.

Also, the DPS 113 manages download-related information and policy associated with a DCAS service. The IPS server 114 stores and manages an SM client to be downloaded to a DCAS host 160.

When a DCAS host 160 connected to a cable network exists, the AP server 111 transmits information associated with an SM of the DCAS host 160 to a Trusted Authority (TA) 120 to authenticate the DCAS host 160. The TA 120 is a reliable external authentication device. The TA 120 authenticates the DCAS host 160 using the received information associated with the SM.

The AP server 111 receives the download-related information from the DPS 113. The download-related information may include information associated with a connection (mapping) between the IPS server 114 and DCAS host 160 (IPS-host mapping information), information associated with a download scheme of the SM, information associated with a DCAS operating policy, and download scheduling information.

In this instance, the AP server 111 commands the IPS server 114 to perform a process to download the SM client based on the download-related information. The IPS server 114 performs the process to download the SM client according to a download scheme corresponding to download-related information selected by the DPS 113 from a plurality of download schemes. The plurality of download schemes may correspond to a variety of transfer protocols such as a Carousel, Trivial File Transfer Protocol (TFTP), Hyper-Text Transfer Protocol (HTTP), and the like.

When an authentication of the DCAS host 160 is completed, the DCAS host 160 downloads and installs the SM client in the SM of the DCAS host 160. The DPS 113 reports to the CAS server 140 a program access authority of the authenticated DCAS host 160 through a billing system 130. In this instance, the CAS server 140 transmits an Entitlement Management Message (EMM) to the DCAS host 160 through a Cable Modem Termination System (CMTS) 150.

The SM client downloaded and installed in the SM of the DCAS host 160 extracts a code word using the received EMM through a CAS messages processing operation. Also, the SM client transmits the extracted code word to a Transport Processor (TP). The TP decodes the encrypted and received program using the code word.

Figure 2:
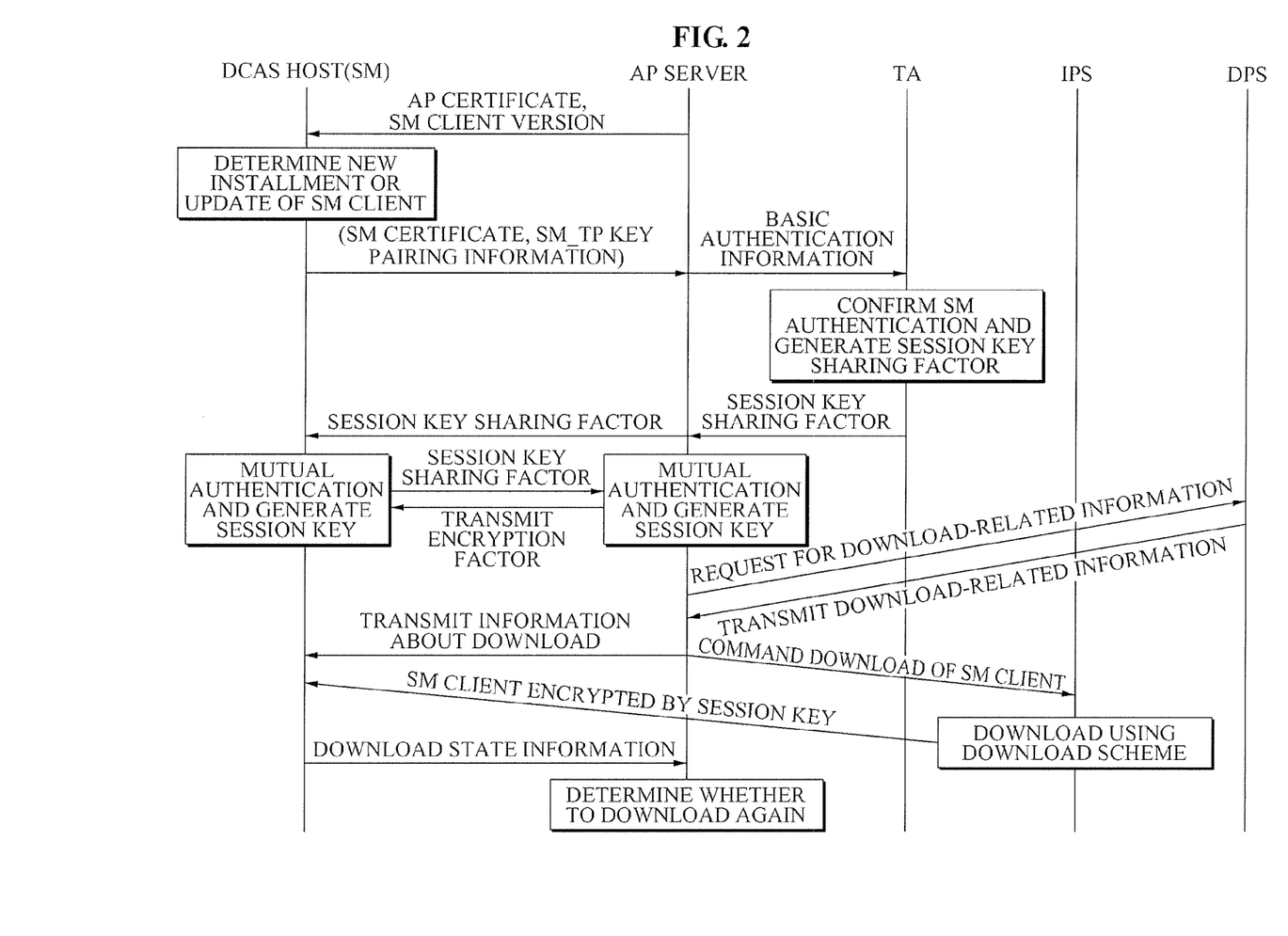
FIG. 2 is a flowchart illustrating an operation method of a DCAS according to an embodiment of the present invention.

FIG. 2 is a flowchart illustrating an operation method of a DCAS according to an embodiment of the present invention.

Referring to FIG. 2, an AP server continuously transmits a certificate of the AP server and SM client version information to a DCAS host via a DCAS network protocol interface. The certificate of the AP server and SM client version information, currently operated, are used to determine whether downloading of an SM client is necessary. The certificate of the AP server is used to authenticate a message received from the AP server by the DCAS host, and to confirm an identity of the AP server.

The DCAS host connected to a DCAS network determines whether to newly install or update the SM client using the received SM client version information. When the SM client is determined to be newly installed or updated, the DCAS host transmits basic authentication information to the AP server.

The basic authentication information includes information associated with a key pairing of a TP and SM, a certificate of the SM, and the like. The certificate of the SM may be used when the AP server authenticates a message received from the DCAS host and confirms an identity of the DCAS host.

The AP server transmits the basic authentication information to the TP, and the TP authenticates the SM. When the authentication of the SM is completed, the AP server generates a session key sharing factor, and transmits the generated session key sharing factor to the AP server.

The AP server shares the session key sharing factor with the DCAS host. The AP server and DCAS host sharing the session key sharing factor perform a mutual authentication. When the authentication is completed, each session key is generated. The session key may be used to encrypt or decrypt a DCAS message and SM client.

The AP server requests a DPS for download-related information. The download-related information may include information associated with a connection (mapping) between an IPS server and DCAS host, information associated with an address of the IPS server, and information associated with a download scheme of the SM or a name of an SM client. The AP server transmits the download-related information to the DCAS host.

The AP server commands the IPS server to perform a process to download the SM client according to a download scheme. The IPS server performs the process to download the SM client according to the selected download scheme. In this instance, the downloaded SM client is encrypted by a session key.

The DCAS host transmits download state information to the AP server in association with whether the SM client is normally downloaded. The AP server determines whether the SM client is to be downloaded again based on the received download state information. When it is determined that the SM client is to be downloaded again, the AP server performs a process to download the SM client again.

Figure 3:
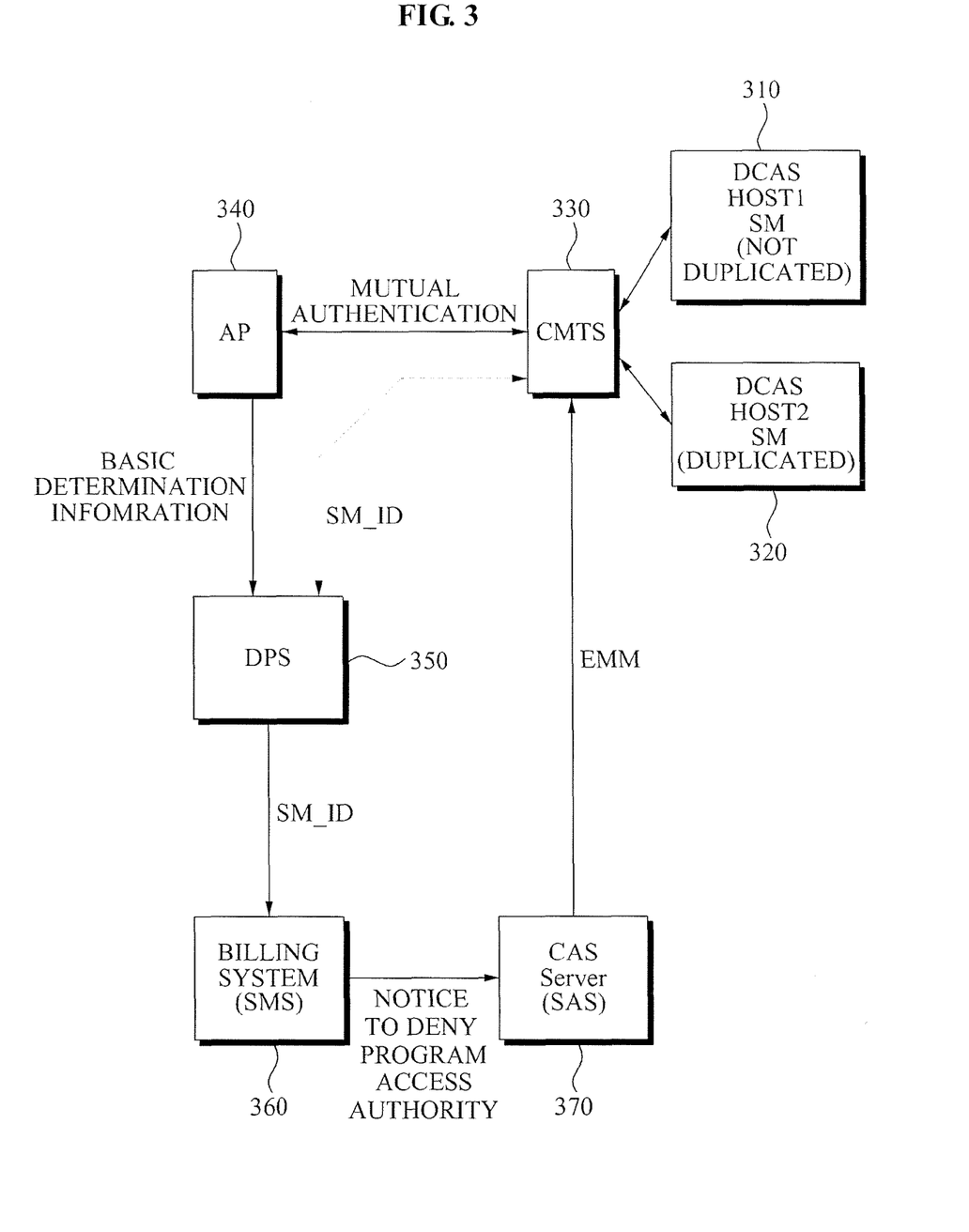
FIG. 3 is a diagram illustrating a DCAS including a Downloadable Conditional Access System Provisioning Server (DPS) detecting a duplicated secure micro (SM) according to an embodiment of the present invention.

FIG. 3 is a diagram illustrating a DCAS including a DPS 350 detecting a duplicated secure micro according to an embodiment of the present invention.

Referring to FIG. 3, DCAS host (1) 310 includes a non-duplicated SM, and DCAS host (2) 320 includes a duplicated SM. When DCAS host (1) 310 and DCAS host (2) 320 are connected to an AP server 340 through a CMTS 330, DCAS host (1) 310, DCAS host (2) 320, and AP server 340 perform mutual authentication.

When the authentication of DCAS host (1) 310 and DCAS host (2) 320 is completed, the AP server 340 transmits basic determination information to a DPS 350. The basic determination information is used to determine whether SMs of DCAS host (1) 310 and DCAS host (2) 320 are duplicated.

The basic determination information may include an ID of SM (SM_ID), Internet Protocol (IP) address, and authentication completion time of DCAS host (1) 310 and DCAS host (2) 320, or ID information of the AP server 340.

The DPS 350 detects whether an SM is duplicated based on the basic determination information through processes to be described below. When it is suspected that the SMs of DCAS host (1) 310 and DCAS host (2) 320 are duplicated, the DPS 350 requests the AP server 340 to re-transmit SM_ID of each of DCAS host (1) 310 and DCAS host (2) 320.

The AP server 340 requests DCAS host (1) 310 and DCAS host (2) 320 to transmit SM_ID of each of DCAS host (1) 310 and DCAS host (2) 320, and receives SM_ID of each of DCAS host (1) 310 and DCAS host (2) 320. Also, the AP server 340 transmits the received SM_ID of each of DCAS host (1) 310 and DCAS host (2) 320 to the DPS 350.

When DCAS host (1) 310 and DCAS host (2) 320 are being operated in IP addresses different from each other, the DPS 350 may receive the same two SM_IDs. The DPS 350 may determine that the SMs of DCAS host (1) 310 and DCAS host (2) 320 are duplicated. Accordingly, the DPS 350 may request a program access authority of each of DCAS host (1) 310 and DCAS host (2) 320 to be denied.

Also, the DPS 350 transmits SM_ID of DCAS host (1) 310 and DCAS host (2) 320 to a billing system 360. The billing system 360 includes a subscriber management system.

The billing system 360 stores mapping information between an SM_ID and a DCAS host of each subscriber of a fee-based service, in a database. Also, the billing system 360 retrieves mapping information corresponding to the received SM_ID using the database. The billing system 360 denies the program access authority of each of DCAS host (1) 310 and DCAS host (2) 320 based on the retrieved mapping information.

The billing system 360 reports to a Conditional Access System (CAS) server 370 that the program access authority of each of DCAS host (1) 310 and DCAS host (2) 320 is denied. The CAS server 370 processes an EMM to prevent the DCAS host (1) 310 and DCAS host (2) 320 having the duplicated SM_ID from accessing the program.

Figure 4:
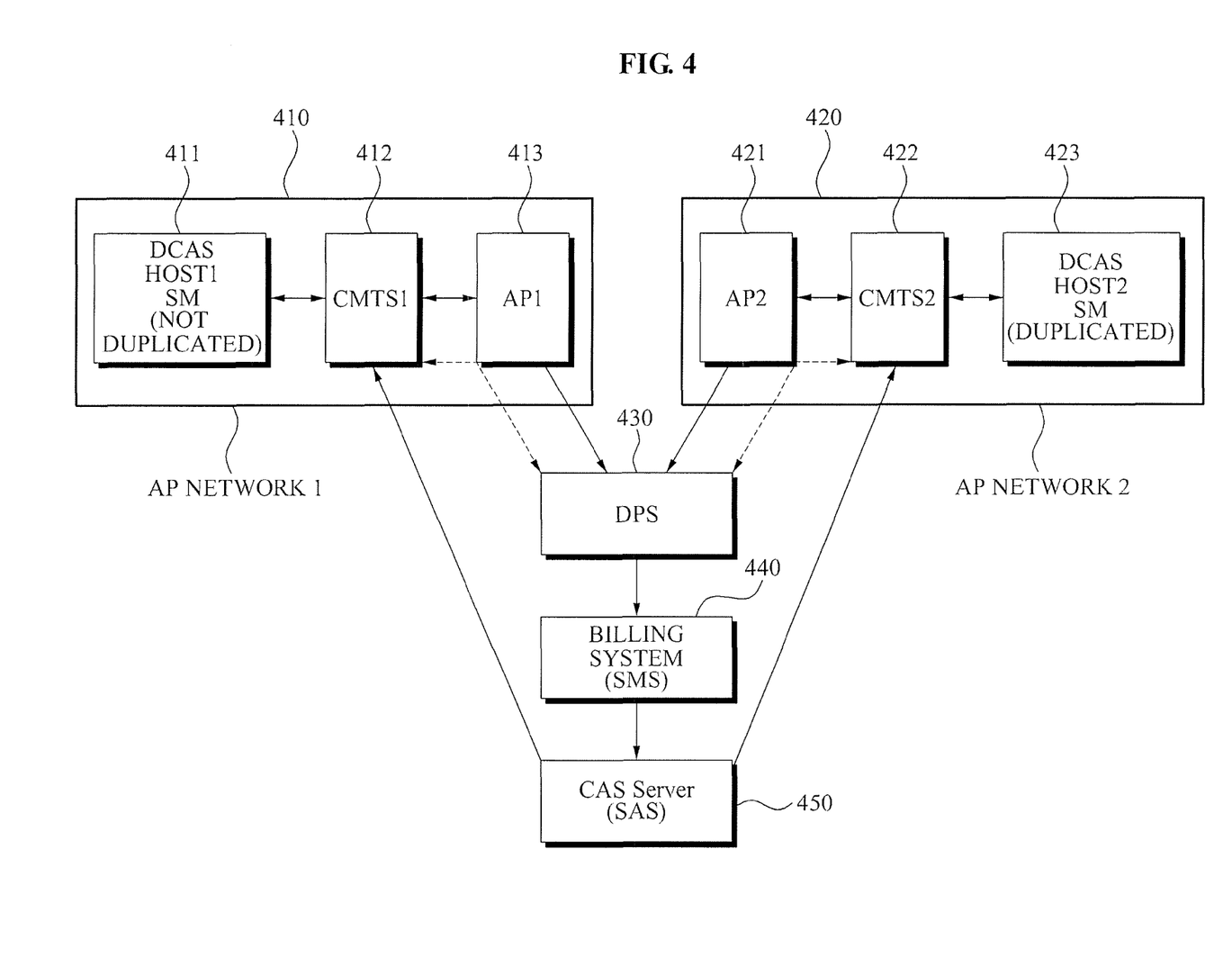
FIG. 4 is a diagram illustrating a DCAS including a DPS detecting a duplicated secure micro in two Authentication Proxy (AP) networks.

FIG. 4 is a diagram illustrating a DCAS including a DPS 430 detecting a duplicated SM in two AP networks.

Referring to FIG. 4, AP network (1) 410 includes DCAS host (1) 411, CMTS (1) 412, and AP server (1) 413. AP network (2) 420 includes DCAS host (2) 423, CMTS (2) 422, and AP server (2) 421. Also, DCAS host (1) 411 has a non-duplicated SM, and DCAS host (2) 423 has a duplicated SM.

The DPS 430 receives SM_ID from each of AP server (1) 413 and AP server (2) 421 to determine whether the SM is duplicated. When the same two SM_IDs are received, the DPS 430 determines that the SM is duplicated.

As described above with reference to FIG. 3, a billing system 440 denies a program access authority of each of DCAS host (1) 411 and DCAS host (2) 423. A CAS server 450 processes an EMM to prevent DCAS host (1) 411 and DCAS host (2) 423 from accessing the program.

According to an embodiment of the present invention, the DPS 430 may determine whether the SM is duplicated, even when a DCAS host having a duplicated SM connects to another AP network.

Figure 5:
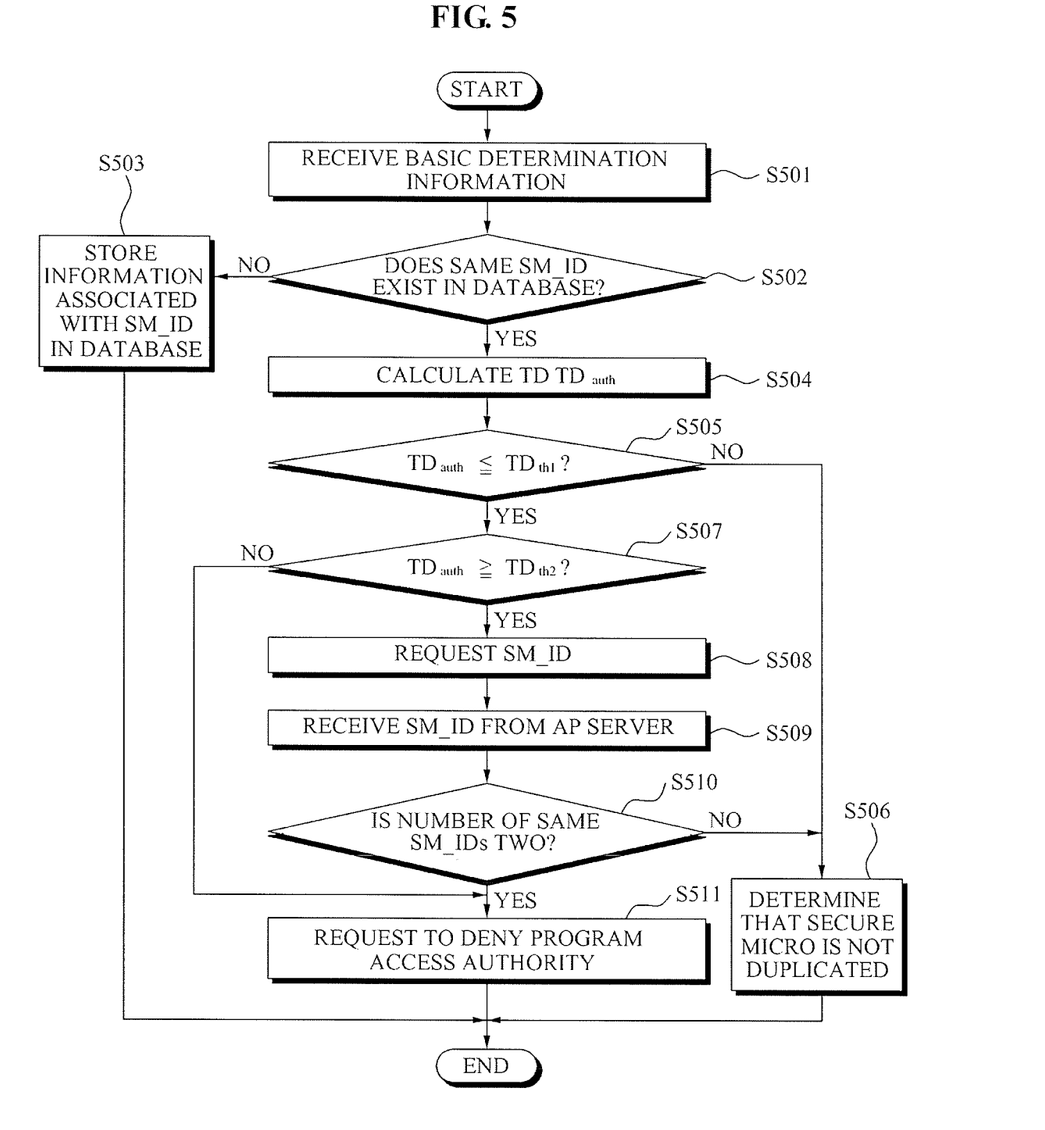
FIG. 5 is a flowchart illustrating an operation method of a DPS detecting a duplicated SM.

FIG. 5 is a flowchart illustrating an operation method of a DPS detecting a duplicated secure micro.

Referring to FIG. 5, in operation S501, the DPS receives basic determination information to determine whether an SM is duplicated. The basic determination information may include SM_ID, IP address and authentication completion time of DCAS host, or ID information of an AP server.

In operation S502, the DPS determines whether the same SM_ID exists in a database.

When the same SM_ID does not exist in the database, the DPS stores information associated with SM_ID in the database in operation S503. Also, the DPS determines that the DCAS host is initially accessed, and determines that the SM is not duplicated. Accordingly, the DPS terminates the operation method.

Conversely, when the same SM_ID exists in the database, the DPS extracts a time when the DCAS host is finally authenticated in a first IP address from the database. Also, the DPS extracts a time when the DCAS host is authenticated in a second IP address from the basic determination information. The second IP address different from the first IP address is a current IP address.

In operation S504, the DPS calculates authentication time difference information $TD_{auth}$. The authentication time difference information $TD_{auth}$ is a value of a difference between the time when the DCAS host is finally authenticated in the first IP address and the time when the DCAS host is authenticated in the second IP address.

In operation S505, the DPS compares the authentication time difference information $TD_{auth}$ with a predetermined first reference value $TD_{th1}$. The first reference value $TD_{th1}$ may be adjustable. As the first reference value $TD_{th1}$ decreases, a process to determine whether the SM is duplicated may become simpler, and thus efficiency of network may be improved. However, as the first reference value $TD_{th1}$ increases, whether the SM is duplicated may be determined more accurately.

When the authentication time difference information $TD_{auth}$ is greater than the first reference value $TD_{th1}$, it is determined that the SM is not duplicated in operation S506. In general, when an SM is not duplicated, the authentication time difference information $TD_{auth}$ has a great value.

However, when the authentication time difference information $TD_{auth}$ is less than or equal to the first reference value $TD_{th1}$, the DPS compares the authentication time difference information $TD_{auth}$ with a second reference value $TD_{th2}$ in operation S507. The second reference value $TD_{th2}$ is used to determine whether the SM is duplicated, and is set to be less than an average time. The average time is an average value of a time from when power is supplied to the DCAS host to when authentication of the DCAS host is completed.

Accordingly, when the authentication time difference information $TD_{auth}$ is less than the second reference value $TD_{th2}$, it may be determined that the SM is duplicated. In operation S511, the DPS determines that the SM is duplicated and requests to deny the program access authority of the DCAS host.

Conversely, when the authentication time difference information $TD_{auth}$ is greater than or equal to the second reference value $TD_{th2}$, it may be determined that the SM is duplicated or it may be determined that the SM is not duplicated. In operation S508, the DPS requests the DCAS host having the SM for SM_ID through an AP server to determine whether the SM is duplicated more accurately.

In operation S509, the DPS receives SM_ID from the AP server. In operation S510, the DPS determines whether a number of received same SM_IDs is two.

When the number of received same SM_IDs is two, it may be determined that a duplicated SM exists in a network. Accordingly, the DPS requests to deny a program access authority of a DCAS host having SM_IDs in operation S511.

Conversely, when the number of received SM_ID is one, the DPS determines that the SM is not duplicated in operation S506.

The operation method according to an embodiment of the present invention may be described through a variety of operation subjects, which are not illustrated in FIGS. 1 through 5.

Specifically, an operation method of an AP server corresponding to a DPS according to an embodiment of the present invention may include following operations: transmitting, to a DPS, a time when a host is finally authenticated in a first address and a time when the DCAS host is authenticated in a second address; collecting, when a value of a difference is between a predetermined first reference value and second reference value, IDs of an SM of the DCAS host in response to a request for collecting the IDs of the SM from the DPS; and transmitting the collected IDs to the DPS. The value of the difference is a difference between the time when the DCAS host is finally authenticated in the first address and the time when the DCAS host is authenticated in the second address.

Also, an operation method of a subscriber management system which may be operated corresponding to a DPS according to an embodiment of the present invention may include following operations: receiving a request for denying a program access authority of an SM from a DPS, when the DPS determines that the SM is duplicated; detecting a DCAS host where the SM is installed using the request for denying the program access authority of the SM; and denying the program access authority of the DCAS host.

The operation methods of the DPS, AP server, and subscriber management system according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 6:
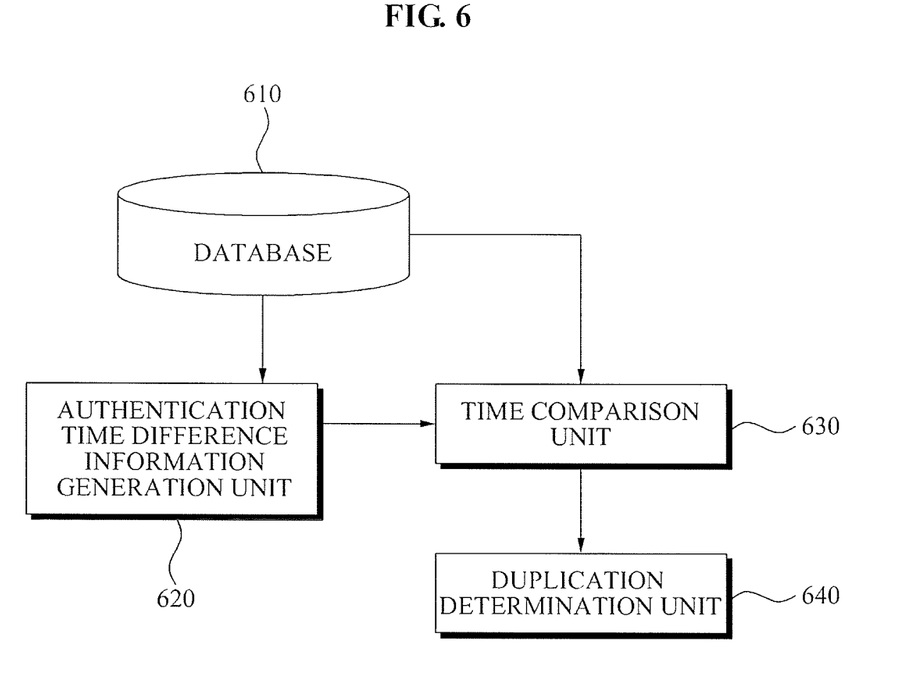
FIG. 6 is a block diagram illustrating a DPS according to an embodiment of the present invention.

FIG. 6 is a block diagram illustrating a DPS according to an embodiment of the present invention.

Referring to FIG. 6, the DPS includes a database 610, authentication time difference information generation unit 620, time comparison unit 630, and duplication determination unit 640.

The database 610 stores a time when a DCAS host is finally authenticated in a first address. The time is received from an AP server.

The authentication time difference information generation unit 620 receives a time when the DCAS host is authenticated in a second address from the AP server, and generates authentication time difference information. The authentication time difference information is associated with a value of a difference between the time when the DCAS host is finally authenticated in the first address and the time when the DCAS host is authenticated in the second address.

The time comparison unit 630 compares the authentication time difference information with a first reference value and a second reference value. The second reference value is less than the first reference value.

The duplication determination unit 640 determines whether an SM is duplicated based on a result of the comparing.

In this instance, when the value of the authentication time difference information is between the first reference value and the second reference value, the duplication determination unit 640 may collect IDs of the SM, and determine whether the SM is duplicated based on a number of same collected IDs of the SM. Specifically, when the value of the authentication time difference information is greater than the first reference value, the duplication determination unit 640 may determine that the SM is not duplicated. When the value of the authentication time difference information is less than the second reference value, the duplication determination unit 640 may determine that the SM is duplicated.

Since a detailed description which is illustrated but not described in FIG. 6 has been described with reference to FIGS. 1 through 5, it will be omitted herein.

According to the present invention, there is provided a method and apparatus for detecting a downloadable conditional access system (DCAS) host with a duplicated secure micro (SM) which may efficiently determine whether an SM is duplicated based on authentication time difference information associated with a value of a difference between a time when a DCAS host is finally authenticated in a first address and a time when the DCAS host is authenticated in a second address.

Also, according to the present invention, there is provided a method and apparatus for detecting a DCAS host with a duplicated SM which, when it is suspected that an SM is duplicated based on authentication time difference information, may efficiently determine whether the SM is duplicated based on a number of IDs received from the SM.

Also, according to the present invention, there is provided a method and apparatus for detecting a DCAS host with a duplicated SM which, when it is determined that an SM is duplicated, may deny a program access authority of the SM.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A computer implemented method of detecting a duplication of a secure micro, the method comprising:
    providing a processor and a memory,
    generating by the processor authentication time difference information associated with a value of a difference between a time when a host is finally authenticated in a first address and a time when the host is authenticated in a second address;
    comparing by the processor the authentication time difference information with a first reference value and a second reference value, the second reference value being less than the first reference value; and
    determining by the processor whether the secure micro is duplicated based on a result of the comparing; and
    wherein the determining whether the secure micro is duplicated is done prior to the host receiving access to any program,
    wherein when the secure micro is determined to be duplicated based on the result of the comparing, then the secure micro of each authenticated host is denied a program access authority of the secure micro, and
    wherein when the secure micro has been determined to be duplicated, then the time for the host of the first address to be authenticated with an authentication proxy (AP) server is greater than the time for the host of the second address to be authenticated with the (AP) server, and
    wherein, when the value of the authentication time difference information is between the first reference value and the second reference value, the determining collects identifications (IDs) of the secure micro, and determines whether the secure micro is duplicated based on a number of same collected IDs of the secure micro, and
    wherein the second reference value is set to be less than an average time, and the average time is an average value of a time from when power is supplied to the host to when authentication of the host is completed.

2. The method of claim 1, wherein, when the number of same IDs of the secure micro is two, the determining determines that the secure micro is duplicated.

3. The method of claim 1, further comprising:
    maintaining or denying the program access authority of the secure micro depending on a result of the determining.

4. The method of claim 1, wherein, when the value of the authentication time difference information is greater than the first reference value, the determining determines that the secure micro is not duplicated.

5. The method of claim 1, wherein, when the value of the authentication time difference information is less than the second reference value, the determining determines that the secure micro is duplicated.

6. The method of claim 1, wherein the first reference value and second reference value are adjustable parameters.

7. The method of claim 1, wherein the generating generates the authentication time difference information based on the time when the host is finally authenticated in the first address and the time when the host is authenticated in the second address, the two different times being received from the authentication proxy (AP) server.

8. An operation method of an authentication proxy (AP) server, comprising:
    transmitting, to a Downloadable Conditional Access System Provisioning Server (DPS), a time when a host is finally authenticated in a first address and a time when the host is authenticated in a second address;
    collecting, when a value of a difference is between a predetermined first reference value and second reference value, identifications (IDs) of a secure micro of the host in response to a request for collecting the IDs of the secure micro from the DPS, the value of the difference being a difference between the time when the host is finally authenticated in the first address and the time when the host is authenticated in the second address, and transmitting the collected IDs to the DPS, and
    wherein the transmitting of the collected ID to the DPS is done prior to the host receiving access to any program,
    wherein when the host authenticated in the first address and the host authenticated in the second address each have a same ID of the secure micro, then the DPS denies a program access authority of the secure micro of each authenticated host, and
    wherein when the host authenticated in the first address and the host authenticated in the second address each have the same ID of the secure micro, then the time for the host of the first address to be authenticated with the (AP) server is greater than the time for the host of the second address to be authenticated with the (AP) server; and
    wherein, when the value of the authentication time difference information is between the first reference value and the second reference value, the determining collects identifications (IDs) of the secure micro, and determines whether the secure micro is duplicated based on a number of same collected IDs of the secure micro, and
    wherein the second reference value is set to be less than an average time, and the average time is an average value of a time from when power is supplied to the host to when authentication of the host is completed.

9. An operation method of a subscriber management system, the operation method comprising:
    receiving a request for denying a program access authority of a secure micro from a Downloadable Conditional Access System Provisioning Server (DPS), when the DPS determines that the secure micro is duplicated in two or more hosts;
    detecting the two or more hosts where the secure micro is installed using the request for denying the program access authority of the secure micro; and
    denying the program access authority to each of the two or more hosts, wherein the DPS determines whether the secure micro is duplicated based on authentication time difference information, first reference value, and second reference value, the authentication time difference information being a value of a difference between a time when a host is finally authenticated in a first address and a time when the host is authenticated in a second address, the second reference value being less than the first reference value, wherein the DPS determines whether the secure micro is duplicated prior to the host receiving access to any program, and wherein each of the host authenticated in the first address and the host authenticated in the second address having a same identification (ID) of the secure micro allows for the secure micro of each authenticated host to have a program access authority of the secure micro, and wherein the program access authority of the secure micro is denied to each of the authenticated hosts when the time for the host of the first address to be authenticated with an authentication proxy (AP) server is greater than the time for the host of the second address to be authenticated with the (AP) server and wherein, when the value of the authentication time difference information is between the first reference value and the second reference value, the determining collects identifications (IDs) of the secure micro, and determines whether the secure micro is duplicated based on a number of same collected IDs of the secure micro, and wherein the second reference value is set to be less than an average time, and the average time is an average value of a time from when power is supplied to the host to when authentication of the host is completed.

10. A method of detecting a duplication of a secure micro, the method comprising:

providing a processor and a memory, the memory having stored thereon:

generating authentication time difference information associated with a value of a difference between a time when a host is finally authenticated in a first address and a time when the host is authenticated in a second address;

comparing the authentication time difference information with a first reference value and a second reference value, the second reference value being less than the first reference value; and determining whether the secure micro is duplicated based on a result of the comparing, wherein the determining whether the secure micro is duplicated is done prior to the host receiving access to any program through a cable network, wherein when the secure micro is determined to be duplicated, then the secure micro of each authenticated host is denied a program access authority of the secure micro, wherein the program access authority of the secure micro is denied to each of the authenticated hosts when the time for the host of the first address to be authenticated with an authentication proxy (AP) server is greater than the time for the host of the second address to be authenticated with the (AP) server, wherein the host is connected to a cable modem termination system, and wherein, when the value of the authentication time difference information is between the first reference value and the second reference value, collecting identifications (IDs) of the secure micro, and determining whether the secure micro is duplicated based on a number of same collected IDs of the secure micro, and wherein the second reference value is set to be less than an average time, and the average time is an average value of a time from when power is supplied to the host to when authentication of the host is completed.

* * * * *